(12) United States Patent
Howell

(10) Patent No.: US 7,494,162 B1
(45) Date of Patent: Feb. 24, 2009

(54) KNOT-TYING DEVICE FOR JOINING FISHING LEADERS

(76) Inventor: Charles Francis Howell, 849 Olivina Ave., Livermore, CA (US) 94551

( * ) Notice: Subject to any disclaimer, the term of this patent is extended or adjusted under 35 U.S.C. 154(b) by 0 days.

(21) Appl. No.: 12/079,583

(22) Filed: May 6, 2008

(51) Int. Cl.
*D03J 3/00* (2006.01)

(52) U.S. Cl. .......................................... 289/17

(58) Field of Classification Search ............... 289/2, 289/17, 18.1; 43/1, 4
See application file for complete search history.

(56) References Cited

U.S. PATENT DOCUMENTS

| | | | | |
|---|---|---|---|---|
| 1,522,571 A | * | 1/1925 | Becker | 289/17 |
| 2,825,592 A | * | 3/1958 | Semple | 289/17 |
| 2,947,558 A | * | 8/1960 | Bethune, Jr. | 289/2 |
| 3,700,272 A | * | 10/1972 | Bauer | 289/17 |
| 3,713,680 A | * | 1/1973 | Pagano | 289/17 |
| 3,787,081 A | | 1/1974 | Macy | |
| 4,400,025 A | | 8/1983 | Dennison | |
| 4,403,797 A | | 9/1983 | Ragland, Jr. | |
| 4,613,173 A | | 9/1986 | Rosser | |
| 5,020,833 A | * | 6/1991 | Wardall | 289/17 |
| 5,094,370 A | * | 3/1992 | Specht | 223/46 |
| 5,236,232 A | | 8/1993 | Broberg | |
| 5,240,295 A | * | 8/1993 | Spencer | 289/1.5 |
| 5,690,369 A | | 11/1997 | Steck, III | |
| 5,690,370 A | | 11/1997 | Steck, III | |
| 5,694,826 A | | 12/1997 | Slivinski | |
| 6,648,378 B1 | * | 11/2003 | Torres et al. | 289/1.5 |

OTHER PUBLICATIONS

"Orvis EZ Knot Tool," <http://www.riverwire.com/cgi-bin/category.cgi?item=2065>, accessed on Jan. 10, 2008.
Koehler Industries, "Tru-Blood Knot Typer," Hartland, MI.

* cited by examiner

*Primary Examiner*—Shaun R Hurley
(74) *Attorney, Agent, or Firm*—Gough, Shanahan, Johnson and Waterman; William L. MacBride, Jr.

(57) ABSTRACT

A knot-tying device with a rectangular card body made of rigid, buoyant material, including a retaining means for entraining separate leader lines in crossing diagonal relation, and a swivel disc cut from said card body, adapted to pivot in the card body. The swivel disc contains a bifurcated slot having closed ends extending to a single open end, receiving separate leader lines, for easy manipulation by fishermen with limited dexterity. The device is not costly to manufacture, small and easily stored, with few movable parts and withstands vigorous use. The operator swivels the disc, entrains the tag ends of the leader lines as well as the remaining lines in the card body, and the lines in the swivel disc slots. The operator rotates the swivel disc, forming the knot, then threads the tag ends through the gap in the knot, completing the knot-tying process.

5 Claims, 6 Drawing Sheets

KNOT-TYING DEVICE FOR JOINING FISHING LEADERS

BACKGROUND OF THE INVENTION

The present invention relates to the field of knot-tying devices for fly fishing. More particularly, the invention is directed to a quicker, easier, and improved device and method for facilitating the tying of a blood knot, barrel knot, and allied knots utilized for splicing and joining the free extremities of lines and leaders for fly fishing.

Fly fishing is a sportsman's craft which demands a considerable amount of skill, not only in casting a fly line, but also in connecting the fly to the fly line via the leader material. Tying a fishing line knot to a fishing attachment is frequently a difficult and tedious task, aggravated by cold weather and tenuous physical settings in which the fisherman must operate his or her craft. Plastic monofilament fishing line is commonly used today, which is a very fine and translucent material frequently hard to see and difficult to manipulate.

A leader line or leader in a fly fishing setup attaches the fly line to the fly. The fly line is big and thick; the fly is delicate and small. Therefore, the materials comprising the leader line or leader must weigh little to not overpower the fly. The leader is comprised of butt, taper and tippet sections, in decreasing size from butt end (at the fly line) to tippet end (at the fly). The leader portion of the fly fishing setup is constructed of nylon monofilament, flourocarbon, thermoplastic, polyethylene or other analogous material, attached to the fly line at its butt end via a nail knot or other allied knot tapering down to the leader's smaller or tippet end at its point of attachment to the fly. A knot in the leader line or leader material is tied by joining together the tag or free end of the leader closest to the butt (the "taper tag end") with the tag end closest to the tippet (the "tippet tag end"). A fisherman may change flies often, cutting off and replacing tippet. Consequently, the leader may be composed of one or more knots, principally barrel or blood knots, by which an experienced fly fisherman may alter the length as well the diameter of the leader throughout the length to accommodate the fly.

To the experienced fly fisherman, the makeup of the leader depends on a number of factors, including: the size and configuration of the fly, the size of the fish the fisherman expects to catch, and the conditions of the water and wind in which the fisherman will cast his or her line. Some fishermen utilize a leader that has a true taper, consisting of one segment of line having a gradual change in diameter from the butt end to the tippet end without any break in the leader material; or a leader that may consist of multiple lengths of varying diameter leader material tied together to construct this change in diameter from the butt end to the tippet end. This latter alternative leader, the knotted leader, enables the fisherman to construct a leader to the necessary requirements for the specific fishing situation. During the course of fly fishing, a fly fisherman can expect to replace the tippet, or end section, of the leader if it breaks or when a fly needs to be replaced. At some point, therefore, the fisherman can expect to need to lengthen the leader by adding more tippet, necessitating a knot in the leader.

The leader knot, and particularly the blood knot, is difficult to tie. Devices for aiding a fisherman in tying knots such as the blood knot to the leader material are well known in the industry. However, a quicker and easier means for tying such knots and extending the leader is desired. A device that would "lock in" the ends of the leaders and enable them to be easily manipulated by the fisherman with limited or inhibited dexterity would be an asset to such a fisherman. Prior devices have tried to address these issues, but only in an awkward manner, requiring devices with multiple movable parts for complicated manipulation by the fisherman. Accordingly, an object of the present invention is to minimize the difficulty of manually joining two pieces of leader material (i.e., two leaders) together by means of a blood knot, barrel knot, or allied knot.

Not only are these devices difficult to manipulate, they are not buoyant in water; and such devices, as well as much of the fly fisherman's equipment, are always subject to potential loss when fishing. Prior knot-tying devices are not lightweight for easy transportation, do not possess a slim design for easy portability, and need considerable improvement in weight and strength, again, for portability as well as durability. Therefore, the field of prior devices to date are not self-contained; the functioning parts being susceptible to loss or disassembly, are not built in a slim design, are not buoyant in water, are not easily and efficiently manipulated, are generally of a size inconvenient for size and portability, and have a weight and strength that are either insufficient or overdone for their task.

The present invention consists of one movable part and a simple design made of essentially two materials. Accordingly, another object of the present invention is to provide a simple device, not costly to manufacture.

The present invention is a knot-tying device providing a self-contained unit where all parts are joined as a single entity, in a rectangular, "credit-card type" size and design, constructed of polyvinyl chloride (PVC) pre-expanded foam or other extremely buoyant material, built in a small, easily stored, and quickly manipulated construction; and built utilizing such rigid, lightweight material. By using the credit-card size design, the present invention is small, convenient to store, and easily manipulated. The present invention is made of rigid, lightweight material, such as the PVC pre-expanded foam. Another object of the present invention, therefore, is to provide a knot-tying device which is lightweight, durable, easy to use and carry/store, of slim construction, with few movable parts, which does not sink in water, and which stands up to vigorous use. Accordingly, it is a principal object of the present invention to provide an improved fisherman's knot-tying device for use in tying knots to leader material in a leader.

Related art provides information regarding fly-tying devices, as examples: U.S. Pat. No. 2,825,592 to Semple, U.S. Pat. No. 3,787,081 to Macy, U.S. Pat. No. 4,400,025 to Dennison, U.S. Pat. No. 5,020,833 to Wardall, U.S. Pat. No. 5,236,232 to Broberg, U.S. Pat. No. 5,240,295 to Spencer and U.S. Pat. Nos. 5,690,369 and 5,690,370 to Steck, III, and two items on the market, "Tru-Blood Knot Tyer"™ and the "Orvis EZ Knot Tool". The references cited as examples of the prior or related art taken alone or in combination fail to show, describe, or suggest the present invention. The present invention as disclosed and claimed hereby provides distinct and useful advantages not previously known in this field of knot-tying devices for fly fishing. While providing for some means for the tying of fishing knots, none of the related art patents provide the features of a swivel-disc with a slot within a rectangular card body, elements found in the present invention.

While the Macy, Dennison, Spencer, and '369 to Steck III patents provide for a rotating function, none of this related art supplies the feature of one movable part of a swivel-disc element in order to facilitate threading of the separate leader lines. The patents to Semple and Wardall and the two cited marketed devices require hand threading of the leader lines or hand rotation or twirling of the entire device and have no rotating element or function to form the knot. The patent to Wardall provides for an entirely different means for facilitating the tying of flies: an opening between cooperative plates, thereby having a function, manner, and features totally distinguishable from the present invention. As well, the patents to Macy, Spencer, Dennison, Wardall, Semple, and '369 and '370 to Steck III, utilize U-shaped cooperative plates and posts or pins, providing the manner in which leader lines are tied in these respective related art inventions. The patents to Macy, Dennison, Spencer, and Steck III, and the Tru-Blood Knot Tyer™ device provide, as well, coaxial pivot means or slits for manipulating the leader lines. Finally, the patents to Macy, Dennison, Spencer, and '369 to Steck III all function to produce blood knots utilizing a rotating frame means, with posts and/or winders not found in the present invention.

While all of the aforementioned related art inventions require some user hand-manipulation in order to tie a line in conjunction with use of the invention, the patents to Semple, Dennison, '370 to Steck III, and Broberg, and the Orvis EZ Knot Tool device require joining, threading, winding or wrapping the lines manually to tie the knot. The patents to Semple, Wardall, Dennison and Broberg and the Orvis EZ Knot Tool device require the user to hold the tag ends of the fishing lines for the performance of the knot-tying function, which is not required by the present invention.

Other related art devices provide information about knot-tying, as examples: U.S. Pat. No. 4,403,797 to Ragland, Jr., and U.S. Pat. No. 4,613,173 to Rosser, and U.S. Pat. No. 5,694,826 to Slivinski possess functions and elements of jigs or braiding mechanisms and, as with the cited devices on the market, have no line-divider element such as the swivel disc in the present invention, for tying blood knots. The patents to Broberg and '370 to Steck III lack this basic function of providing a device for tying blood knots to tie leader lines, as well. The devices of the patents to Semple, Macy, Dennison, Wardall, Spencer, and '369 Steck III, and the Tru-Blood Knot Tyer™ device provide the features of pins, posts, fingers or spaced legs to facilitate the line-dividing mechanism to provide the crossing diagonal relationship of the separate leader lines necessary to the rotating function. Only the device of the present invention provides the swivel disc mechanism for crossed placement of the leader lines.

Although these related art patented inventions provide features for knot-tying devices, and all except the patents to Rosser, Ragland, '370 to Steck III and Broberg, function to create barrel, blood, or allied knots for tying leader lines, none including these four provide the combination of the rectangular card swivel-disc in one movable part to entrain the leader tag ends and, to divide and rotate the leader lines to create the leader knot, as found in the knot-tying device of the present invention.

Still further objects and advantages of the present invention will become apparent from a consideration of the ensuing descriptions and drawings.

SUMMARY OF THE INVENTION

The present invention is a knot-tying device with a rectangular card body which may be substantially the shape, thickness, and size of a credit card. The rectangular card body is preferably made of rigid, buoyant materials, such as PVC pre-expanded foam. The rectangular card body has four rounded corners and four holes proximal to said rounded corners. Protruding from and attached within each rounded corner is a retaining means entraining separate leader lines in crossing diagonal relation to each other, preferably metallic coils or leaf springs. The knot-tying device has a swivel disc cut from said card body and adapted to pivot perpendicularly transverse to the card body plane, with an edge along its circumference for receiving a springing mechanism means for maintaining the swivel disc in pivotal and rotating cooperation with the card body. The swivel disc contains a bifurcated slot having two closed ends centrally located and extending to a single open end at said edge of the swivel disc, receiving the separate leader lines in crossing diagonal relation.

Devices for aiding a fisherman in tying knots such as the blood knot to the leader material are well known in the industry. However, a device that would "lock in" the ends of the leaders and enable them to be easily manipulated by the fly fisherman with limited or inhibited dexterity would be an asset to such a fisherman. Therefore, an object of the present invention is to minimize the difficulty of manually joining two pieces of leader material. The present invention consists of one movable part and a simple design made of essentially two materials. Accordingly, another object of the present invention is to provide a simple device, not costly to manufacture. By using the credit-card size design, the present invention is small, convenient to store, and easily manipulated, made of rigid, lightweight material. An object of the present invention, therefore, is to provide a knot-tying device which is lightweight, durable, easy to use and carry/store, of slim construction, with few movable parts and which does not sink in water, and which stands up to vigorous use.

The operator swivels the swivel disc on its two opposing pivot points so that the swivel disc is perpendicularly transverse to the planar surface of the card body. The operator entrains the two tag ends in the retainer means in the upper corners of the card body. The operator entrains the other ends of said separate leader lines in the slots of the swivel disc and secures their remaining lengths in the remaining retainer means in the lower corners of the card body. Both lines of the separate leader lines are now in the separate slots, left and right, respectively, of the swivel disc, and cross each other. The operator rotates the swivel disc circumferentially in the direction away from the operator as shown and toward the card body, forming the knot. The operator threads the tippet tag end and the taper through the gap created by the now twisted separate leader lines, completing the knot process.

Although the related art patented inventions provide features for knot-tying devices, none provide the combination of the rectangular card swivel-disc in one movable part to entrain the leader tag ends and to divide and rotate the leader lines to create the leader knot, as found in the knot-tying device of the present invention.

Other and further objects and advantages of the present invention will appear hereinafter.

BRIEF DESCRIPTION OF THE DRAWINGS

Other objects and features will become apparent from the following detailed description taken in combination with these accompanying drawings. However, the drawings are provided for purpose of illustration only, and are not intended as a definition of the limits of the invention.

Similarly referenced characters denote corresponding features throughout the accompanying drawings.

DETAILED DESCRIPTION OF THE INVENTION

The present invention will now be described more fully hereinafter with references to the accompanying drawings, in which the preferred embodiment of the invention is shown. This invention may, however, be embodied in different forms and should not be construed as limited to the embodiment set forth herein. Rather, the illustrative embodiment is provided so that this disclosure will be thorough and complete, and will fully convey the scope of the invention to those skilled in the art. Like numbers refer to like elements throughout.

Figure 1:
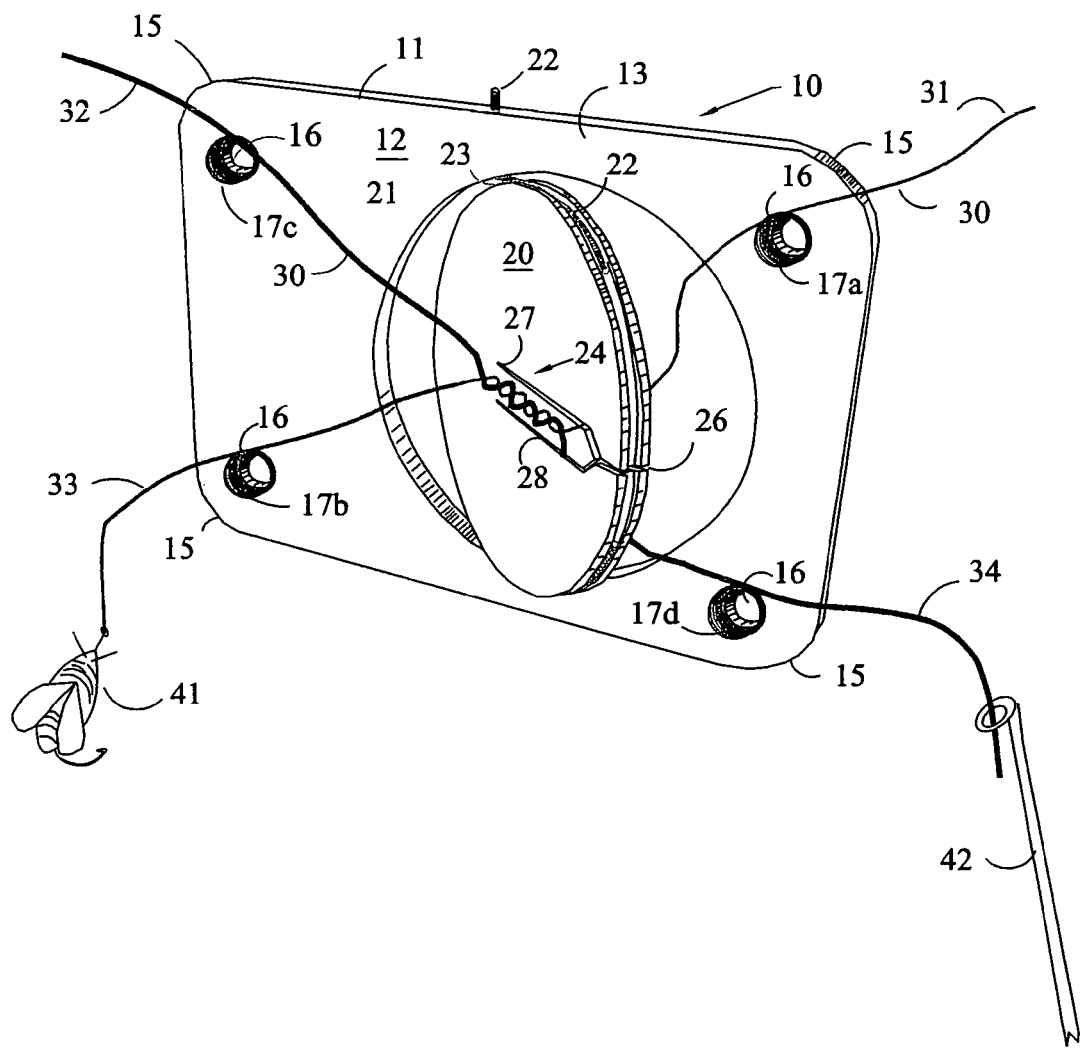
FIG. 1 is a perspective view of this embodiment of the knot-tying device in accordance with the present invention.
Figure 2:
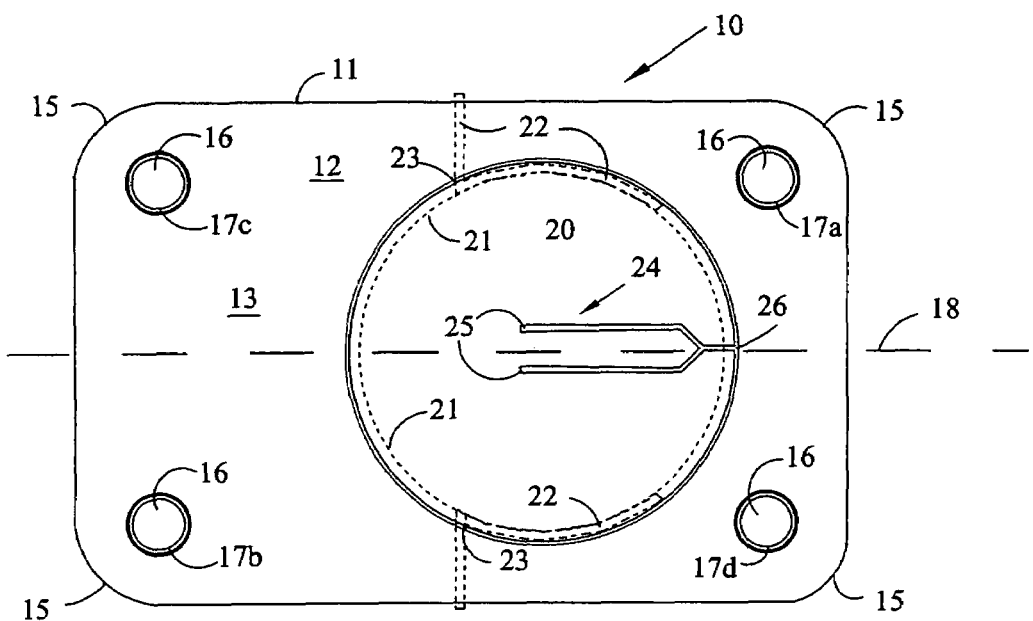
FIG. 2 is an elevation plan view of the rectangular card body and the swivel disc of this embodiment in accordance with the present invention.
Figure 3:
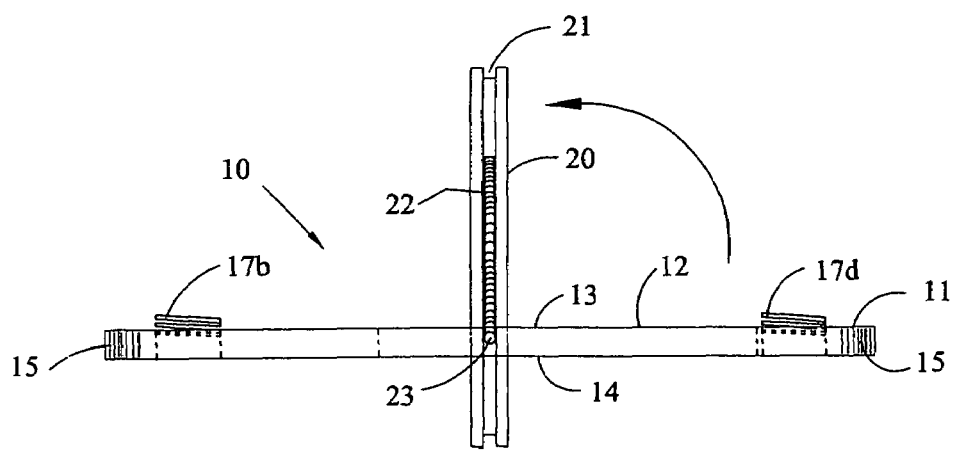
FIG. 3 is a side view of the rectangular card body of this embodiment in accordance with the present invention with the swivel disc in an elevated side view pivoted in the direction of the pivot arrow.

Now, turning in detail to the drawings, a preferred embodiment of the present invention is shown in FIG. 1, a perspective view of the knot-tying device 10, and FIG. 2, an elevation view of the knot-tying device 10 with a rectangular card body 11 which may be formed in substantially the shape, thickness, and size of a credit card, having a substantially planar surface 12, with a first side 13 and a second side 14, depicted in FIG. 3. The rectangular card body 11 is preferably made of rigid, buoyant material, such as PVC pre-expanded foam or other analogous material well known in the art. The rectangular card body 11 has four rounded corners 15 and four holes 16 proximal to said rounded corners 15. As shown in FIG. 1, protruding from and attached within each of the four holes 16 is a retaining means 17 (17a, 17b, 17c, and 17d, respectively) for entraining separate leader lines 30 in crossing diagonal relation to each other. The retaining means 17 (17a, 17b, 17c, and 17d, respectively) are preferably metallic coil or leaf springs made of resilient metal wire or similarly resilient material well known in the art, formed to entrain fishing line. The knot-tying device 10 may be longer than a credit card to facilitate longer leader line. Further depicted in FIG. 1 are the two, separate leader lines 30 (the tippet 33 and the taper 34), attaching the fly 41 to the separate leader lines 30 in the fly rod 42.

Figure 4:
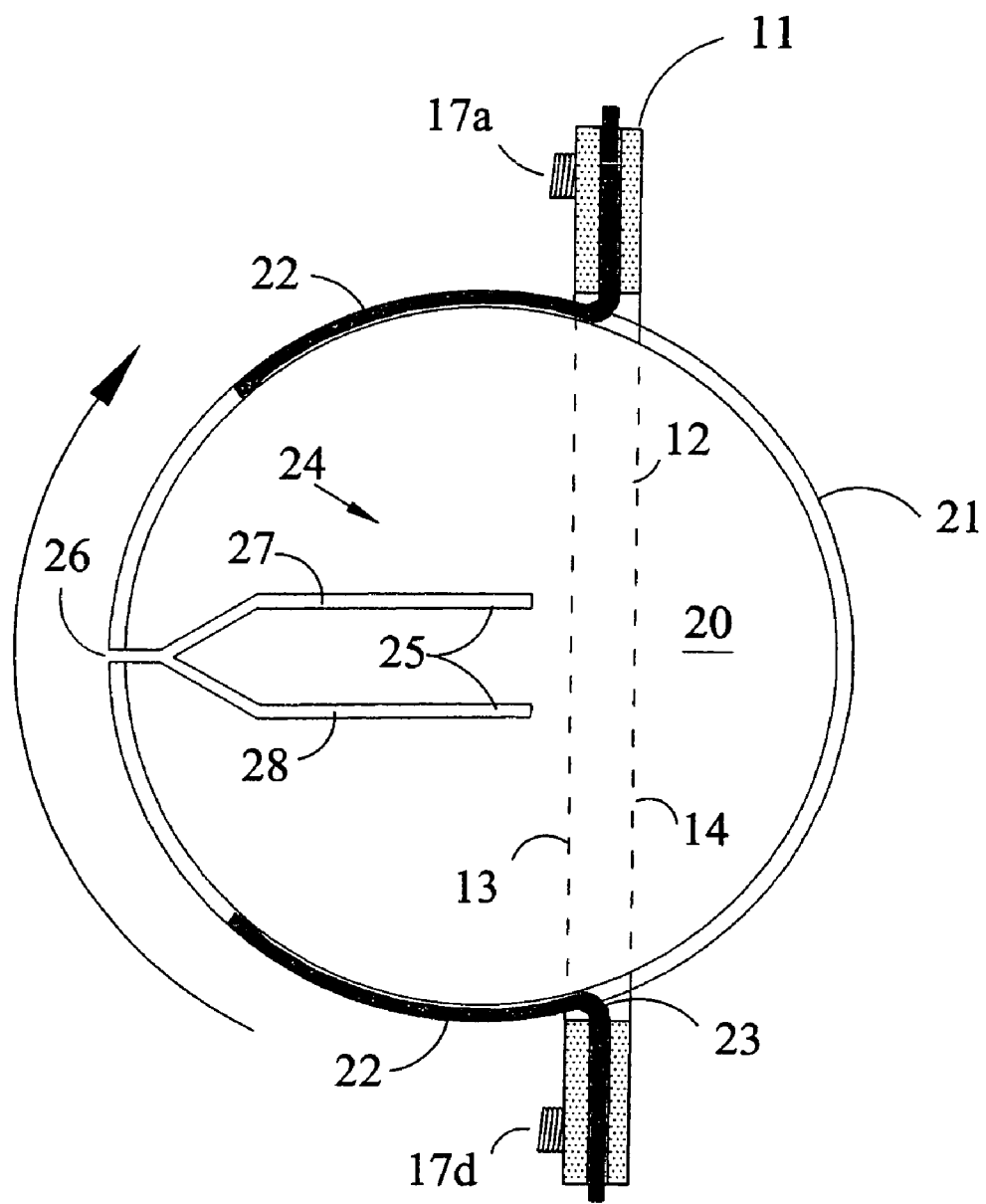
FIG. 4 is an elevated side and sectional view of the rectangular card body showing the position of the springing mechanism means depicting the swivel disc in an elevated plan view rotating in the direction of the rotation arrow of this embodiment in accordance with the present invention.

As shown in FIG. 3, a side view of the rectangular card body 11 with an elevated side view of swivel disc 20, the knot-tying device 10 has a swivel disc 20 cut from the card body 11 and adapted to pivot perpendicularly transverse to the planar surface 12 of the card body 11. The swivel disc 20 has an edge with an indented groove 21 along its circumference for receiving a springing mechanism means 22 for maintaining the swivel disc 20 in pivotal and rotating cooperation with the card body 11. The springing mechanism means 22 is twisted metal wire or analogous material well known in the art. The springing mechanism means 22 forms two opposing pivot points 23 along the edge 21 enabling the swivel disc 20 to operate in pivotal cooperation with said card body, as depicted in FIGS. 1 and 3. As shown in FIGS. 2 and 4, the swivel disc 20 contains a bifurcated slot 24 having two closed ends 25 centrally located and extending to a single open end 26 at said edge 21 of the swivel disc 20. The bifurcated slot 24 is shown in FIG. 4, an elevated side view of the rectangular card body 11 showing in sectional view the position of the springing mechanism means 22 depicting the rotation of the swivel disc 20 in an elevated plan view, and depicted here preferably as having a "tuning fork" shape or arrangement, but said slot 24 may be formed in any bifurcated shape or manner accomplishing the same function, for receiving the separate leader lines 30 in crossing diagonal relation to each other. As depicted in FIG. 1, the bifurcated slot 24 receives the separate leader lines 30 in crossing diagonal relation to each other, further shown in FIG. 5 (an elevated plan view of the rectangular card body 11, with an elevated side view of the swivel disc 20). The swivel disc 20 is situated off center from said card body 11, as shown in FIG. 2, along a lengthwise central axis 18 of the card body 11. As further depicted in FIG. 2, the two opposing pivot points 23 are non-diametrically located along the edge 21 of the swivel disc 20 to pivotally engage the swivel disc 20 to the rectangular card body 11.

The operation of the knot-tying device 10 is simple and straightforward. Upon looking at said device 10 in FIG. 2, it will be noticed that the swivel disc 20 is not central to the length of the rectangular card body 11. In proper orientation for operation, the knot-tying device 10 is constructed so that the right side of the rectangular card body 11 is closest to said edge 21 of the swivel disc 20 when viewed from the first side 13, as shown in FIGS. 2 and 3. The operator swivels the disc 20 on its two opposing pivot points 23 so that the swivel disc 20 is perpendicularly transverse to the rectangular card body 11, with the bifurcated slot 24 on the first side 13 of said card body 11, as shown in FIGS. 2 and 3. The swivel disc 20 is then rotated circumferentially to orient the bifurcated slot 24 to point traversely or perpendicularly with respect to said card body 11, as shown in FIG. 4, the bifurcated slot 24 located on the same side of the card body 11 as the retaining means 17, which is the first side 13.

Figure 5:
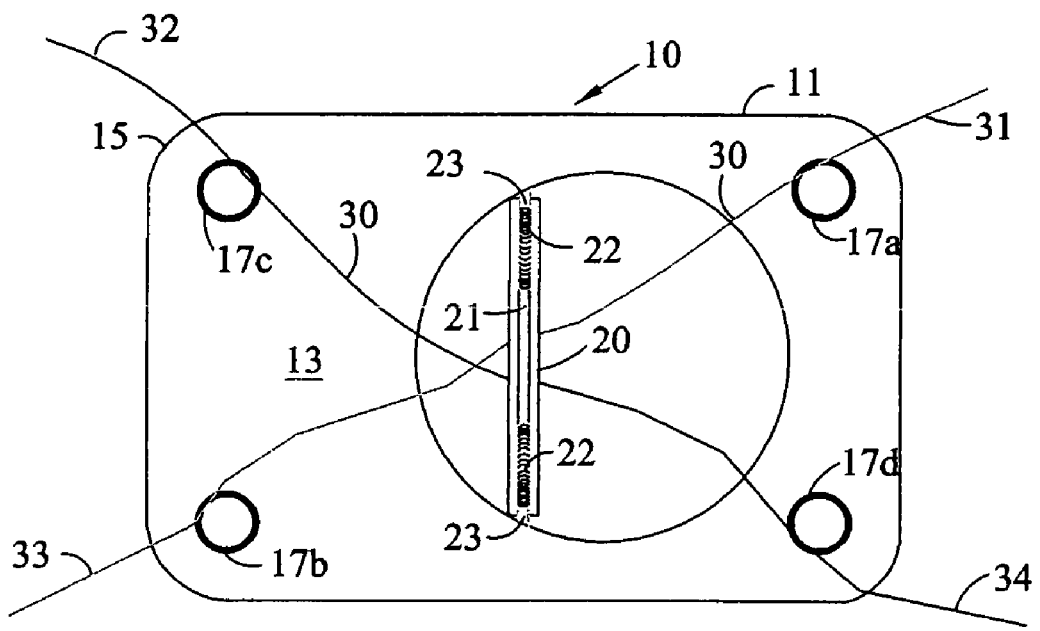
FIG. 5 is an elevated plan view of the rectangular card body with an elevated side view of the swivel disc depicting the placement of the separate leader lines in the swivel disc in accordance with the present invention.

The two separate leader lines 30 are comprised of one having the tippet tag end 31 and the tippet 33 and one having the taper tag end 32 and the taper 34, as initially described above, and depicted in FIG. 5. The operator facing first side 13 entrains the tippet tag end 31 in the retainer means 17a located in the upper right hand corner of said card body 11, shown in FIGS. 1 and 5, allowing the tippet tag end 31 to extend past the retainer means 17a, preferably an approximate 1½ inches. Next, viewing the swivel disc 20 from the right side as depicted in FIG. 4, with the first side 13 oriented to the left, the operator entrains the other end of said separate leader line 30, the tippet 33, through the left slot 27 of the swivel disc 20 and secures its remaining length in the retainer means 17b in the lower left corner of the card body 11, as shown in FIGS. 1 and 5. The taper tag end 32 of the respective separate leader line 30 is then placed in the upper left hand retainer means 17c, as shown in FIGS. 1 and 5, with the operator also allowing the taper tag end 32 to extend past said retainer means 17c preferably in approximate 1½ inches. Looking at the swivel disc 20 as oriented, again in FIG. 4, with the first side 13 oriented to the left, the operator places the taper tag end 32 of the respective separate leader line 30 through the right slot 28 of the swivel disc 20 with the remaining taper 34 being secured in its respective lower right hand retainer means 17d as depicted in FIGS. 1 and 5. Both said lines (32/34 and 31/33, respectively) of the separate leader lines 30 are now in the separate slots, left and right (27 and 28, respectively), of the bifurcated slot 24 to the swivel disc 20, and cross each other in a diagonal manner on the side of the swivel disc 20 depicted in FIG. 5. A slight pull on each of the separate leader line 30 ends away from the rectangular card body 11 by the operator will remove any unwanted slack in said leader lines 30.

Figure 6:
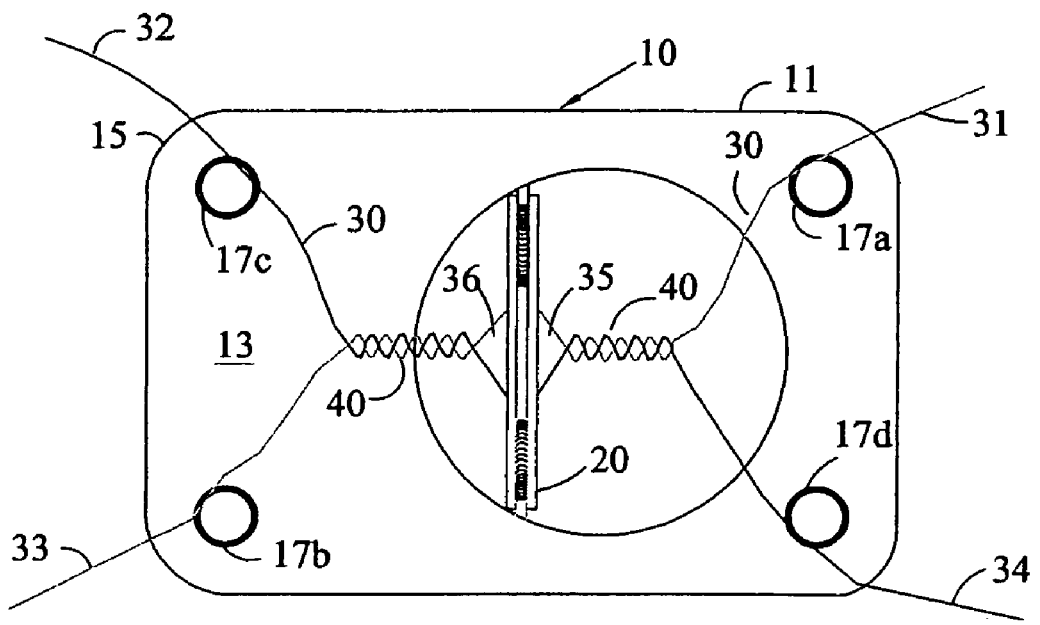
FIG. 6 is an elevated plan view of the rectangular card body and an elevated side view of the swivel disc with the separate leader lines forming a knot in accordance with the present invention.
Figure 7:
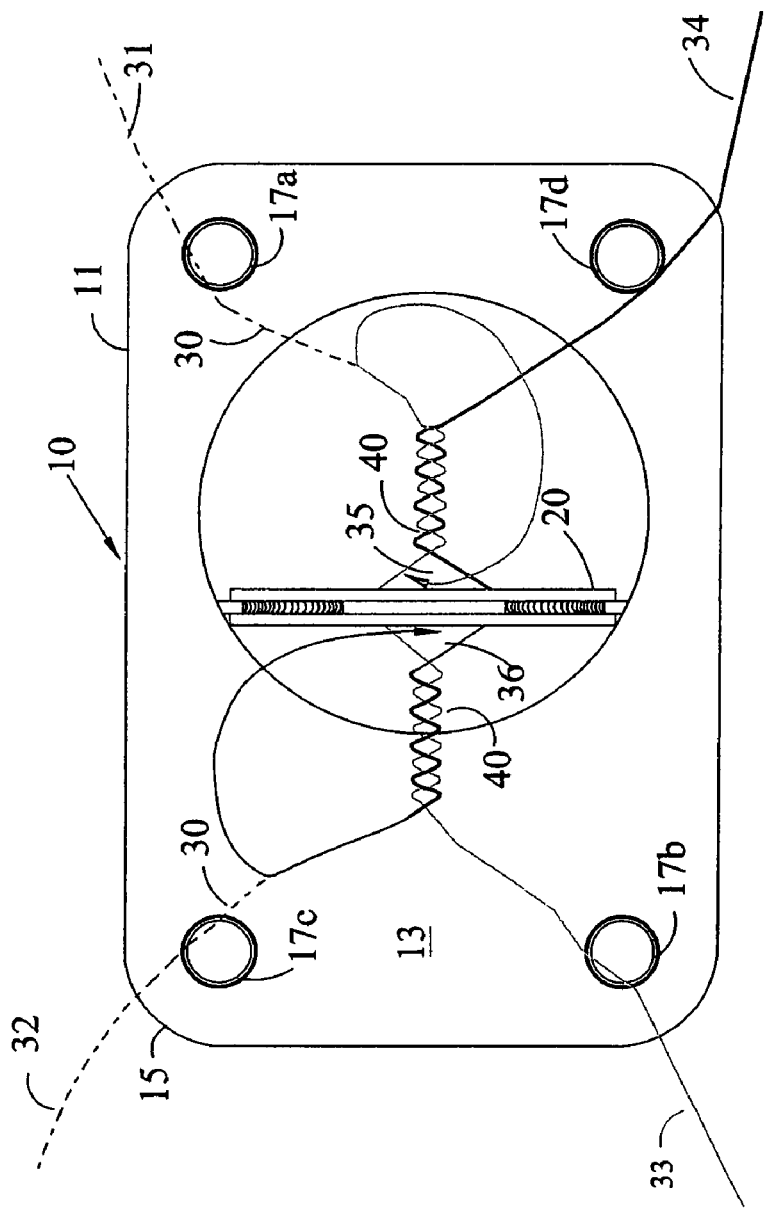
FIG. 7 is an elevated plan view of the rectangular card body and an elevated side view of the swivel disc with the completed, tied knot in accordance with the present invention.

Referring to FIG. 5, the operator rotates the swivel disc 20 circumferentially and clockwise in the direction away from the operator as shown and toward the card body 11, or as shown in FIG. 4 in a clockwise direction, preferably completing a total of four and one quarter (4¼) revolutions, forming the knot 40 from the separate leader lines 30 as depicted in FIG. 6, on each side of the swivel disc 20. Next, the operator removes the tippet tag end 31 from the upper right hand retainer means 17a depicted in FIGS. 1 and 6. Viewing the swivel disc 20 and the rectangular card body 11 as depicted in FIGS. 6 and 7, the operator threads the tippet tag end 31 up through the right gap 35 created by the knot 40 formed from the now twisted separate leader lines 30 on the right side of the swivel disc 20. A gentle upward pull on the tippet tag end 31 by the operator will secure that side of the knot 40. As further depicted in FIGS. 6 and 7, the operator removes the taper tag end 32 from the upper left hand retainer means 17c, and, viewing the disc face as shown in FIGS. 6 and 7, again, the operator threads the taper tag end 32 down through the left gap 36 created by the knot 40 to formed from the now twisted leader lines 30 on the left side of the swivel disc 20. Again, a gentle downward pull on the taper tag end 32 by operator will secure that side of the knot 40.

Figure 8:
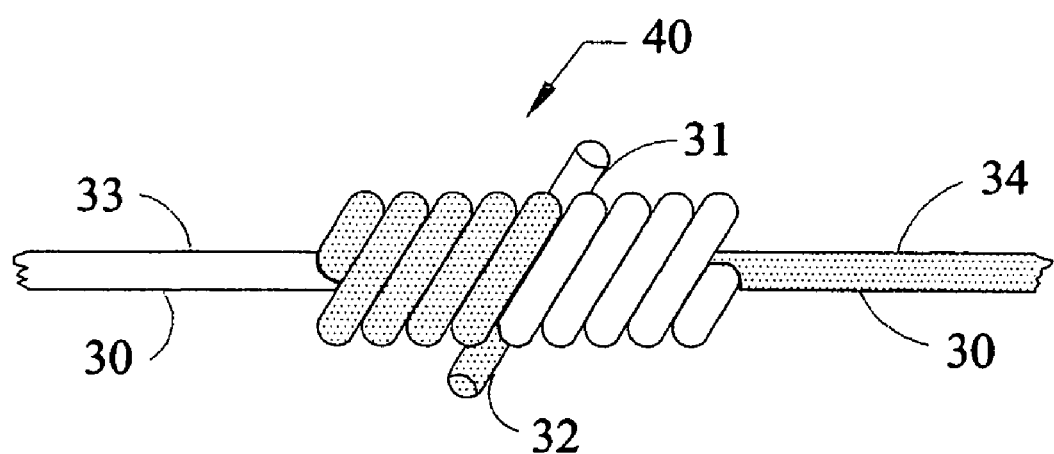
FIG. 8 is a perspective view of the completed, tied knot in accordance with the present invention.

When this operation is complete, each tag end (tippet tag end 31 and taper tag end 32) will be pointed in an opposite direction as shown in FIG. 7. The remaining ends of the separate leader lines 30 are removed from the respective retainer means 17b and 17d as shown in FIG. 7. The swivel disc 20 is rotated so its bifurcated slot 24 is again pointing perpendicular to said card body 11 on the retaining means 17 side, the first side 13, and the separate leader lines 30 with the knot 40 are removed from the device. The operator may moisten the area of the knot 40 and then grasp the long lengths of the separate leader lines 30, pulling each in an opposite direction until the knot 40 is completely formed and tight. The operator may trim any short ends of the separate leader lines 30, and the joining of the separate leader lines 30 to form the knot 40 is complete, as shown in FIG. 8.

The present invention is intended to cover all changes, modifications and variations of the example of said invention herein chosen for purposes of the disclosure which do not constitute departures from the spirit and scope of the present invention. Since many changes, modifications, and variations of the disclosed embodiments of the present invention intended to be covered by the appended claims may be made without departure from the inventive concept, it is not intended to limit the present invention otherwise than as required by the appended claims.

I claim:

1. A knot-tying device, comprising:
   (a) a rectangular card body having a substantially planar surface, with a first side and a second side;
   (b) said card body being made of rigid buoyant material and having four rounded corners;
   (c) said card body having four holes proximal to said rounded corners;
   (d) protruding from the first side and attached to each of said holes is a retaining means for entraining separate leader lines in crossing diagonal relation to each other;
   (e) said device having a swivel disc cut from said card body adapted to pivot perpendicularly transverse to said planar surface of said card body;
   (f) said swivel disc having an edge with an indented groove for receiving a springing mechanism means for maintaining the swivel disc in pivotal and rotating cooperation with said card body;
   (g) the springing mechanism means forming two opposing pivot points along the edge enabling the swivel disc to operate in pivotal cooperation with said card body;
   (h) the swivel disc containing a bifurcated slot having two closed ends centrally located and extending to a single open end at said edge of the swivel disc;
   (i) the bifurcated slot receiving the separate leader lines in crossing diagonal relation to each other when the swivel disc is pivoted, orienting said slot to the first side;
   (j) the swivel disc being cut off center from said card body along a lengthwise central axis of said card body;
   (k) the two opposing pivot points being non-diametrically located along said edge and pivotally engaging the swivel disc to the rectangular card body; and
   (l) whereby the separate leader lines are tied into a knot when the swivel disc is rotated within the rectangular card body.

2. The device according to claim 1, wherein said rigid buoyant material is polyvinyl chloride pre-expanded foam.

3. The device according to claim 1, wherein the bifurcated slot is a tuning fork shape.

4. The device according to claim 1, wherein the retaining means is a metallic coiled spring.

5. The device according to claim 1, wherein the springing mechanism means is twisted metal wire.

* * * * *